US010677618B2

(12) United States Patent
Yanai et al.

(10) Patent No.: US 10,677,618 B2
(45) Date of Patent: Jun. 9, 2020

(54) TESTING OF DEVICE SENSORS ON A MANUFACTURING LINE

(71) Applicant: Intel Corporation, Santa Clara, CA (US)

(72) Inventors: Yael Yanai, Jerusalem (IL); Yehiel Shilo, Jerusalem (IL); Eli Kupermann, Maale Adumim (IL); Chen-Hsun Wu, Taipei (TW); Elena Agranovsky, Jerusalem (IL); Marlon D. Bada, Mabalacat (PH)

(73) Assignee: Intel Corporation, Santa Clara, CA (US)

( * ) Notice: Subject to any disclaimer, the term of this patent is extended or adjusted under 35 U.S.C. 154(b) by 939 days.

(21) Appl. No.: 15/061,535

(22) Filed: Mar. 4, 2016

(65) Prior Publication Data
US 2017/0254683 A1    Sep. 7, 2017

(51) Int. Cl.
*G01D 18/00* (2006.01)
(52) U.S. Cl.
CPC .................................. *G01D 18/00* (2013.01)
(58) Field of Classification Search
CPC ..................................................... G01D 18/00
USPC ....................................................... 73/865.9
See application file for complete search history.

(56) References Cited

U.S. PATENT DOCUMENTS

| 9,151,693 | B1* | 10/2015 | Yang | H04M 1/24 |
| 9,645,040 | B2* | 5/2017 | Lehmann | G05B 19/4183 |
| 2014/0073302 | A1* | 3/2014 | Trethewey | H04W 52/0251 455/418 |
| 2014/0075211 | A1* | 3/2014 | Kumar | G06F 1/266 713/300 |
| 2015/0057961 | A1* | 2/2015 | Montoya | G06F 11/2294 702/121 |
| 2016/0054194 | A1* | 2/2016 | Lehmann | G05B 19/4183 73/49.3 |
| 2016/0192213 | A1* | 6/2016 | Diperna | H04M 1/04 455/425 |
| 2017/0102787 | A1* | 4/2017 | Gu | G06F 3/0346 |

FOREIGN PATENT DOCUMENTS

WO    WO-2014154269 A1 * 10/2014 ......... G05B 19/4183

* cited by examiner

*Primary Examiner* — Nathaniel J Kolb
(74) *Attorney, Agent, or Firm* — Schwabe, Williamson & Wyatt, P.C.

(57) ABSTRACT

Embodiments of the present disclosure provide techniques for sensor testing for computing devices during initial movement of the device, such as movement on a manufacturing line. In one instance, a device with integral sensor testing during initial movement of the device may include a plurality of sensors and a sensor test block coupled with the plurality of sensors, to detect, collect and/or report readings provided by at least some of the sensors in response to movement of the device between at least a first test station and a second test station. Other embodiments may be described and/or claimed.

8 Claims, 3 Drawing Sheets

TESTING OF DEVICE SENSORS ON A MANUFACTURING LINE

FIELD

Embodiments of the present disclosure generally relate to the field of sensor testing for computing devices, and more particularly, to sensor testing during device movement along a manufacturing line.

BACKGROUND

During the manufacturing process of a device, such as a portable computing device, a number of tests may be done to determine potential defects of various parts of the device, such as a keyboard, a touchscreen, ports, audio capabilities, and the like. Among other tests, multiple sensors embedded in the computing device may be tested to determine their aliveness, e.g., reaction to different types of motion of the computing device. The testing of device components may be done on dedicated test stations positioned along a computing device manufacturing line. For example, the testing of device sensors may be done by having a dedicated sensors test station on the manufacturing line where a human operator or a robot may move a device in various directions to check that sensors react to the device motion. However, using dedicated test stations for testing computer device components, such as sensors, may increase the time and cost of the device manufacturing process.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for sensor testing for computing devices during initial movement of a device. The initial movement may include any of several movements experienced by the device during its manufacture, for example, during movement along a manufacturing line. In accordance with embodiments, a device with integral sensor testing during assembly on a manufacturing line may include a plurality of sensors and a sensor test block coupled with the plurality of sensors, to detect, collect and/or report readings provided by at least some of the sensors in response to device motion and/or position change caused by movement of the device between at least a first test station and a second test station of the manufacturing line.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other.

Figure 1:
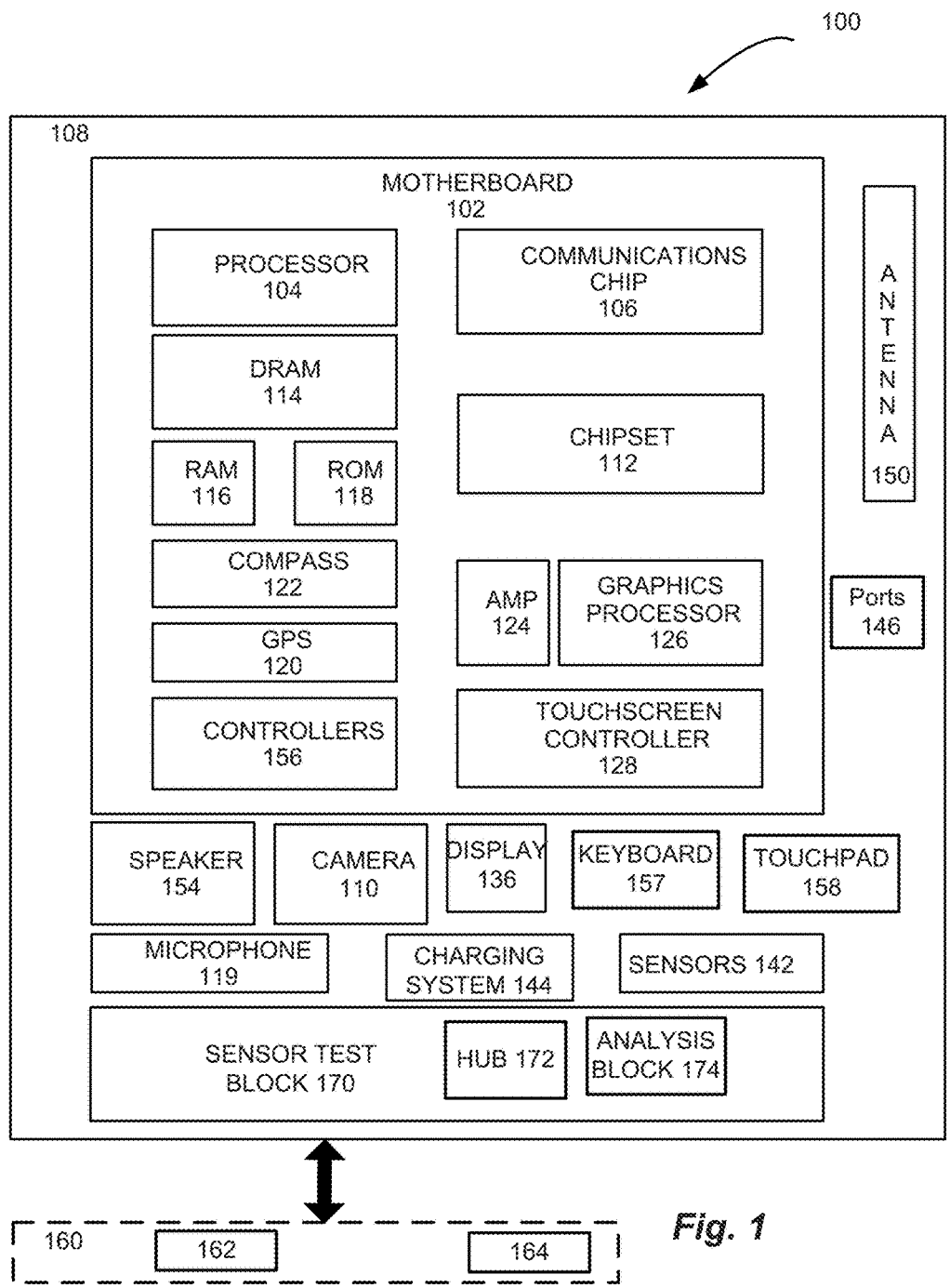
FIG. 1 is an example block diagram illustrating a device configured to provide integral sensor testing during device assembly on a manufacturing line, in accordance with some embodiments.

FIG. 1 is an example block diagram illustrating a device 100 configured to provide integral sensor testing during device assembly on a manufacturing line, in accordance with some embodiments. In embodiments, the apparatus 100 may comprise a computing device, such as a laptop computer, a hand-held or mobile device such as a tablet computer, a game console, or a smartphone, a wearable device, or any other portable computing device. The following description of device 100 components is provided by way of example and is not limiting to this disclosure.

The computing device 100 may house a board such as motherboard 102, e.g., in housing 108. The motherboard 102 may include a number of components, including but not limited to processor 104, a number of sensors 142, and sensor test block 170. The processor 104, which may be any one of a number of known single or multicore processors known in the art, may be physically and electrically coupled to the motherboard 102. In embodiments, the plurality of sensors 142 may include a variety of sensing devices, such as temperature sensors, sweat chemical sensors, motion sensors, galvanic skin response (GSR) sensors, piezo crystals, pressure sensors, or other sensing devices. For example, the sensors 142 may include one or more sensors configured to detect and/or react to a motion of the device 100, such as directional and/or rotational movement of the device 100, as well as disposition of the device 100 in various parts of environments, such as a manufacturing facility. Such sensors may include an accelerometer, a gyroscope, an ambient light sensor, a barometer, or other sensing devices configured to react to a movement, motion, or position of the device 100 in a particular environment. Sensor test block 170 may be configured to facilitate sensors 142 to be tested while computing device 100 moves through a manufacturing line, to be described more fully below.

In some implementations, the computing device 100 may include at least one communication chip 106, which may also be physically and electrically coupled to the motherboard 102. In other implementations, the communication chip 106 may be part of the processor 104. The communication chip 106 may enable wireless communications for the transfer of data to and from the computing device 100. The communication chip 106 may implement any of a number of wireless or wired standards or protocols. In some embodiments, the computing device 100 may include a plurality of communication chips 106, some of which may be dedicated to wireless communications such as Wireless Gigabit Alliance (WiGig), Wi-Fi, Bluetooth®, Global Positioning System (GPS), Enhanced Data Rates for GSM Evolution (EDGE), General Packet Radio Service (GPRS), Code Division Multiple Access (CDMA), Worldwide Interoperability for Microwave Access (WiMAX), Long Term Evolution (LTE), Evolution-Data Optimized (EV-DO) or the like, or wired communications such as Unified Serial Bus (USB) compliant, Secure Digital (SD) compliant, Peripheral Component Interconnect Express (PCIe) compliant, Thunderbolt® compliant, or compliant with some other communication and/or charging configuration.

Depending on its applications, device 100 may include other components that may or may not be physically and electrically coupled to the motherboard 102 and may be embedded with or physically and/or electrically coupled with the device 100. These other components may include, but are not limited to, volatile memory (e.g., dynamic random access memory (DRAM) 114), non-volatile memory (e.g., read only memory (ROM) 118), flash memory, random access memory (RAM) 116, a graphics processor 126, a digital signal processor, a crypto processor, a chipset 112, an antenna 150, a display (e.g., touchscreen display 136), a touchscreen controller 128, a battery/charging system 144, an audio codec, a video codec, a power amplifier 124, a GPS device 120, a compass 122, a plurality of sensors 142, a speaker 154, a camera 110, a mass storage device (such as a solid-state hard drive), controllers 156, microphone 119, a keyboard 157, a touchpad 158, ports 146, and so forth. A number of other components may also be embedded with or coupled with the device 100, and not all of these components are illustrated in FIG. 1.

The various components, including the sensors 142, may be tested during an initial movement of the device 100. As described above, such movement may include any of several movements experienced by the device 100 during its manufacture, for example, during movement of the device 100 along a manufacturing line 160, on which device 100 may be at least partially assembled and/or tested. Testing of the device components may be done, for example, at multiple test stations 162, 164 placed at different locations along the manufacturing line 160, as described below in greater detail.

Those of the sensors 142 that may react to the motion and position change of the device 100 may be tested during a movement of the device 100 along a manufacturing line 160. The movement of device 100 along the manufacturing line 160, such as between test stations 162, 164, may cause motion or position change of device 100 that may be sufficient to test aliveness (e.g., reaction to motion or position change) of the sensors 142.

In order to conduct sensor testing during movement of the device along the manufacturing line 160, the sensor test block 170 may include, for example, a sensor hub 172, to collect the readings provided by the at least some of the plurality of sensors in response to device 100's movement, and analysis block 174 coupled with the sensor hub 172, to analyze the collected readings. In embodiments, the analysis block 174 may be implemented as a software application, firmware, hardware, or a combination thereof.

Figure 2:
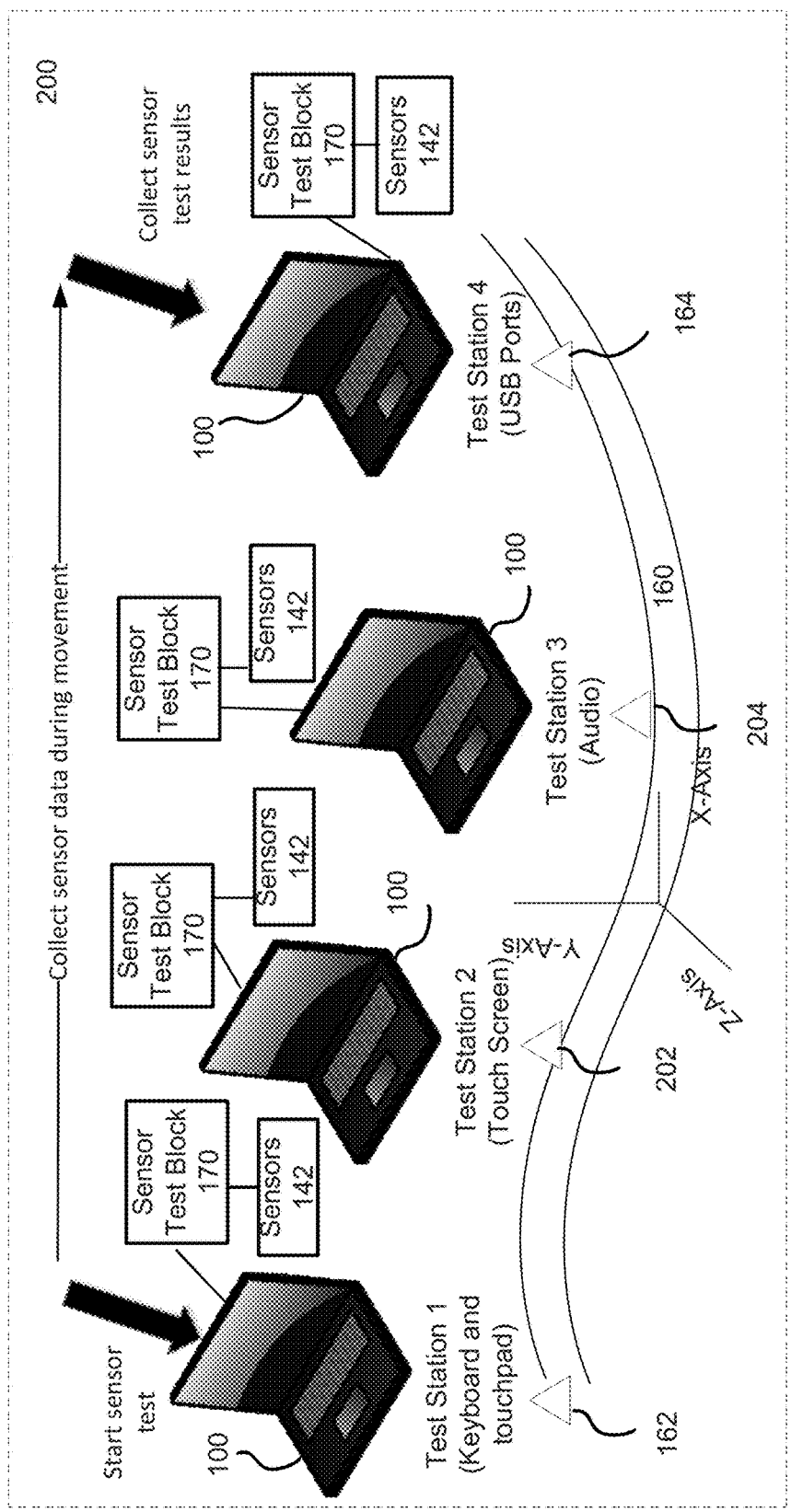
FIG. 2 is an example schematic diagram illustrating sensor testing on a device during movement of the device along a manufacturing line, in accordance with some embodiments.

FIG. 2 is an example schematic diagram illustrating sensor testing on a device during movement of the device along a manufacturing line, in accordance with some embodiments. The device 100 is shown in FIG. 2 with components relevant to the sensor testing in accordance with described embodiments, such as sensors 142 and sensor test block 170. Other device 100 components illustrated in FIG. 1 are omitted in FIG. 2 for ease of understanding.

As shown, the device 100 may experience initial movement during manufacture, such as may move along the manufacturing line 160, which may be located in a manufacturing facility, such as a factory. The manufacturing line 160 may include multiple test stations, such as 162 (first test station), 202 (intermediary test station), 204 (another intermediary test station), and 164 (last test station). In general, the manufacturing line may include any number of test stations, such as two or more. Four test stations 162, 202, 204, and 164 are depicted in FIG. 2 for ease of understanding.

Different device components may be tested at respective dedicated test stations. For example, with reference to FIGS. 1 and 2, keyboard 157 and touchpad 158 of the device 100 may be tested at the test station 162; touchscreen (e.g., display 136 and touchscreen controller 128) may be tested at the test station 202; audio components (e.g., speaker 154) may be tested at the test station 204; and device ports 146 (e.g., USB ports) may be tested at the test station 164. Various other components may be tested at other dedicated test stations that are not described herein.

In a conventional manufacturing environment, the sensors 142 of the device 100 may also be tested at a dedicated test station, much like the components described above. At such test station, the device 100 may be subjected to various types of motion (directional, rotational, etc.) and corresponding sensor data may be collected.

The embodiments described herein provide for testing of those of the sensors 142 that are responsive to various types of motion or position change, during movement of the device 100 along the manufacturing line 160, for example, between test stations 162 and 164. In general, the device 100 may move from one test station to another during the manufacturing process, and device motion (or position change) during the manufacturing process may be used to monitor and check sensors' aliveness, such as reaction to the movement or position change. The results of the testing may be collected, for example, at the end of the manufacturing and/or testing process (e.g., at the last test station 164), without involvement of a dedicated test station. As a result, the described embodiments may provide for saving the cost of a dedicated test station and the test time. Experiments conducted at a manufacturing line may show that the described embodiments may save about 2 to 5 minutes per device on a manufacturing line.

In general, the sensor testing may be conducted during initial movement of the device 100 during manufacture. For example, sensor testing may be conducted during device 100's movement between any two test stations of the manufacturing line 160 and/or over a determined time period. For example, the sensor test block 170 may be configured to initiate sensor readings collection at or around a time the device 100 is placed on the manufacturing line

160, e.g., at the first test station 162. The sensor test block 170 may be further configured to complete the sensor readings collection at or around a time the device reaches a particular test station, such as the last station 164. In some embodiments, the sensor test block 170 may be configured to complete the readings collection in response to expiration of a time period allocated for testing. In some embodiments, the sensor test block 170 may be configured to complete the readings collection in response to collection of a number of readings that may reach (e.g., equal or exceed) a predetermined threshold.

The sensor test block 170 may be further configured to report the collected (and, in some embodiments, analyzed) sensor readings at the last station 164 of the manufacturing line 160. More generally, the sensor test block 170 may provide for processing the sensor readings collected during sensor testing to the device 100 or to an external device at any time of the device 100's initial movement during manufacture, such as movement along the manufacturing line 160, once such readings have been collected and, in some embodiments, analyzed.

The manufacturing line 160 may be disposed in a manufacturing facility 200 in many different ways, and may include, for example, straight portions, turns, curves, elevated or depressed portions, and the like. Furthermore, the manufacturing line 160 may be disposed, at least in some portions, at a different height from the manufacturing facility floor. More generally, the manufacturing line 160 may be disposed, and provide for corresponding movement of the device 100, in one or more, and in some instances, in three dimensions corresponding to X-axis, Y-axis, and Z-axis illustrated in FIG. 2. Device 100 may also be moved through manufacturing line 160 at different speeds in different portions.

Thus, a corresponding movement of the device 100 along the manufacturing line 160 may be defined, at least in part, by disposition of the manufacturing line 160 in the manufacturing facility 200, and may include a forward motion, at least partial rotation, and up-and-down motion (relative to the surface of a factory floor), at the same or different speeds. Accordingly, those of the sensors 142 that may react to this type of motion and device position and velocity change (e.g., from test station 162 to test station 164) may be tested for their reaction to the motion types, position or velocity change (aliveness).

For example, an accelerometer and gyroscope may be tested for their reaction to the forward movement and/or partial rotation of the device 100 during the movement along the manufacturing line 160. A barometer may be tested to react to changes of the device 100's position in Y direction (e.g., relative to the floor of the manufacturing facility 200). An ambient light sensor may be tested to react to changes in ambient light in response to position change of the device 100 in X direction, for example, in response to movement of the device 100 between test station 162 and test station 164.

Figure 3:
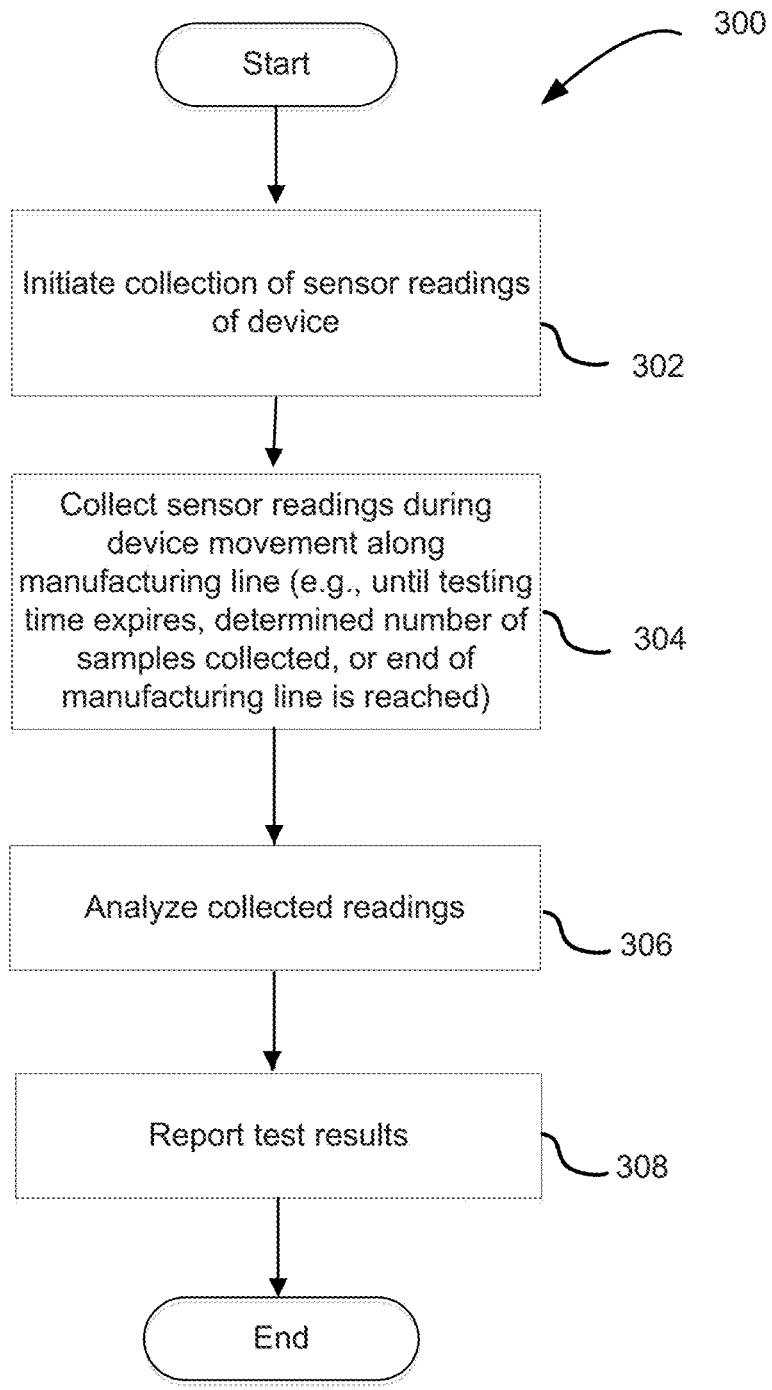
FIG. 3 is an example process flow diagram for testing of sensors of a device on a manufacturing line, in accordance with some embodiments.

FIG. 3 is an example process flow diagram for testing of sensors of a device on a manufacturing line, in accordance with some embodiments. The process 300 may be performed by sensor test block 170, in particular, sensor hub 172 and analysis block 174 of the device 100 of FIG. 1.

At block 302, the process 300 may include initiating collection of readings from at least some of a plurality of sensors of the device, during a movement of the device between at least a first test station and a second test station of the manufacturing line. In some embodiments, the sensor test block may be configured to initiate sensor readings collection in response to, or around or at a time of, a placement of the device on the manufacturing line, e.g., at a first test station of the manufacturing line. In some embodiments, the readings collections may be initiated by a tester manually at a test station, e.g., test station 162. The placement of the first station requires the station operator to activate testing procedure flow, which involves multiple platform components. The embodiments of this disclosure may enable the station operator to include a sensors health test in the list of tested components without explicit separate activation of a sensors health test.

At block 304, the process 300 may include collecting the readings from the sensors of the device during a movement of the device between at least a first test station and a second test station (e.g., last station) of the manufacturing line. The readings may be collected by the sensor hub 172 of the sensor block 170. In some embodiments, the collection of readings may be completed, for example, at or around a time the device reaches a particular test station, such as the last station. In some embodiments, the collection of readings may be completed in response to expiration of the time period allocated for testing. In some embodiments, the collection of readings may be completed in response to collection of a certain number of readings, e.g., a number in excess of a predetermined threshold.

At block 306, the process 300 may include analyzing the collected readings, including verifying responses of at least some sensors to motions associated with the device movement between the first and second test stations. For example, the sensor hub 172 may provide the readings to the analysis block 174 for sensor data analysis.

At block 308, the process 300 may include reporting results of the analysis of the collecting readings to the device or to an external device. The reporting may be provided, for example, in response to, or around a time of, a placement of the device at the last test station of the manufacturing line. The reporting may include, for example, rendering the collected and analyzed readings for display on the device at the second test station, to make the reading available for observation by a tester.

The following paragraphs describe examples of various embodiments.

Example 1 may be a device with integral sensor testing during an initial movement of the device, wherein the device includes a plurality of sensors, and a sensor test block coupled with the plurality of sensors, to detect, collect and report readings provided by at least some of the plurality of sensors in response to movement of the device between at least a first test station and a second test station.

Example 2 may include the subject matter of Example 1, wherein the plurality of sensors includes at least one of: a gyroscope, an accelerometer, an ambient light sensor, or a barometer.

Example 3 may include the subject matter of Example 1, wherein the sensor test block is to report the collected readings for processing to the device or to an external device.

Example 4 may include the subject matter of Example 1, wherein the initial movement includes a movement of the device along a manufacturing line, wherein the sensor test block is to start readings collection at or around a time the device is placed on the manufacturing line.

Example 5 may include the subject matter of Example 1, wherein the sensor test block includes a sensor hub, to collect the readings provided by the at least some of the plurality of sensors, and an analysis block coupled with the sensor hub, to analyze the collected readings.

Example 6 may include the subject matter of Example 1, wherein the initial movement includes a movement of the device along a manufacturing line, wherein the manufacturing line includes more than two test stations, wherein the second test station is a last test station of the manufacturing line, wherein the sensor test block is to report the collected readings at the last station of the manufacturing line.

Example 7 may include the subject matter of Example 6, wherein the sensor test block is to complete the readings collection at or around a time the device reaches the last station.

Example 8 may include the subject matter of Example 1, wherein the sensor test block is to complete the readings collection in response to expiration of a time period allocated for testing or in response to collection of a number of readings that exceeds a predetermined threshold.

Example 9 may include the subject matter of Example 1, wherein the movement of the device between at least a first test station and a second test station includes at least a forward motion, a partial rotation of the device, and a position change of the device, defined at least in part by disposition of a manufacturing line in a manufacturing facility.

Example 10 may include the subject matter of any of Examples 1 to 9, wherein the device comprises a computing device.

Example 11 may be a method for testing a device during an initial movement of the device, comprising: initiating, by a sensor test block coupled with the device, a collection of readings from at least some of a plurality of sensors of the device, during a movement of the device between at least a first test station and a second test station; and providing, by the sensor test block, the collected readings to the device or to an external device for processing.

Example 12 may include the subject matter of Example 11, wherein initiating collection of readings from at least some of a plurality of sensors of the device includes starting, by the sensor test block, the readings collection in response to, or around or at a time of, a placement of the device on a manufacturing line, wherein the plurality of sensors includes at least one of: a gyroscope, an accelerometer, an ambient light sensor, or a barometer.

Example 13 may include the subject matter of Example 11, wherein initiating collection of readings from at least some of a plurality of sensors of the device includes starting, by the sensor test block, the readings collection in response to, or around or at a time of, a placement of the device at the first test station, wherein the first test station is included in a manufacturing line.

Example 14 may include the subject matter of Example 13, further comprising: analyzing, by the sensor test block, the collected readings, including verifying responses of the sensors to motions associated with the device movement between the first and second test stations.

Example 15 may include the subject matter of Example 14, wherein the second test station comprises a last test station of the manufacturing line, wherein the method further comprises: reporting, by the sensor test block, results of the analyzing of the collecting readings, in response to, or around a time of, a placement of the device at the last test station of the manufacturing line.

Example 16 may be a method for testing a device on a manufacturing line, comprising: initiating, by a sensor test block, collection of readings from at least some of a plurality of sensors of a device, at a first test station of a plurality of test stations of the manufacturing line, wherein the device is to move from the first test station to a second test station of the plurality of test stations along the manufacturing line, and wherein the at least some of the plurality of sensors are to provide the readings in response to the device moving along the manufacturing line; and terminating, by the sensor test block, the collection of readings, in response to one of: the device reaching the second test station, a number of readings exceeding a predetermined threshold, or expiration of a time period allocated for the collection of readings.

Example 17 may include the subject matter of Example 16, further comprising: providing, by the sensor test block, the collected readings to the device or to an external device for analysis and processing.

Example 18 may include the subject matter of Example 16, wherein the plurality of sensors includes at least one of: a gyroscope, an accelerometer, an ambient light sensor, or a barometer, wherein the device comprises a computing device.

Example 19 may include the subject matter of Example 16, wherein the second test station is a last test station on the manufacturing line, wherein the method further comprises: rendering, by the sensor test block, the collected readings for display on the device at the second test station.

Example 20 may include the subject matter of any of Examples 16 to 19, further comprising: analyzing, by the sensor test block, the collected readings, including verifying responses of the sensors to motions associated with the device movement between the first and second test stations.

Example 21 may be an apparatus for testing a device on a manufacturing line, comprising: means for initiating collection of readings from at least some of a plurality of sensors of the device, during a movement of the device between at least a first test station and a second test station of the manufacturing line; and means for providing the collected readings to the device or to an external device for processing.

Example 22 may include the subject matter of Example 21, wherein means for initiating collection includes means for starting the readings collection in response to, or around or at a time of, a placement of the device on the manufacturing line, wherein the plurality of sensors includes at least one of: a gyroscope, an accelerometer, an ambient light sensor, or a barometer.

Example 23 may include the subject matter of Example 21, wherein means for initiating collection includes means for starting the readings collection in response to, or around or at a time of, a placement of the device at the first test station of the manufacturing line.

Example 24 may include the subject matter of any of Examples 21 to 23, further comprising: means for analyzing the collected readings, including verifying responses of the sensors to motions associated with the device movement between the first and second test stations.

Example 25 may be an apparatus for testing a device, comprising: means for initiating collection of readings from at least some of a plurality of sensors of a device, at a first test station of a plurality of test stations of a manufacturing line, wherein the device is to move from the first test station to a second test station of the plurality of test stations along the manufacturing line, and wherein the at least some of the plurality of sensors are to provide the readings in response to the device moving along the manufacturing line; and means for terminating the collection of readings, in response to one of: the device reaching the second test station, a number of readings exceeding a predetermined threshold, or expiration of a time period allocated for the collection of readings.

Example 26 may include the subject matter of Example 25, further comprising: means for providing the collected readings to the device or to an external device for analysis and processing.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method for testing a device during a movement of the device along a device manufacturing line, comprising:

initiating, by a sensor test block coupled with the device, a collection of readings from at least some of a plurality of sensors of the device, during a movement of the device between at least a first test station and a second test station included in the device manufacturing line, during a manufacturing of the device, wherein initiating collection of readings from at least some of a plurality of sensors of the device includes starting, by the sensor test block, the readings collection in response to, or around or at a time of, a placement of the device at the first test station, wherein the at least some of the plurality of sensors are responsive to a motion of the device or position change of the device, during the movement of the device between the first and second test stations of the manufacturing line; and providing, by the sensor test block, the collected readings to the device or to an external device for processing, wherein the processing includes analyzing the collected readings, including verifying responses of the sensors to motions associated with the device movement between the first and second test stations, wherein the responses of the sensors include reactions of the sensors to a forward motion of the device, at least a partial rotation of the device, or up-and-down motion of the device at a same speed or at different speeds.

2. The method of claim 1, wherein the initiating of a collection of readings from at least some of a plurality of sensors of the device includes starting, by the sensor test block, the readings collection in response to, or around or at a time of, a placement of the device on a manufacturing line, wherein the plurality of sensors includes at least one of: a gyroscope, or an accelerometer.

3. The method of claim 1, wherein the second test station comprises a last test station of the manufacturing line, wherein the method further comprises: reporting, by the sensor test block, results of the analyzing of the collecting readings, in response to, or around a time of, a placement of the device at the last test station of the manufacturing line.

4. A method for testing a device on a manufacturing line, comprising:

initiating, by a sensor test block, collection of readings from at least some of a plurality of sensors of a device, at a first test station of a plurality of test stations of the manufacturing line, wherein the device is to move from the first test station to a second test station of the plurality of test stations along the manufacturing line, and wherein the at least some of the plurality of sensors are to provide the readings in response to the device moving along the manufacturing line, wherein the at least some of the plurality of sensors are responsive to motions of the device during the movement of the device along the manufacturing line; and terminating, by the sensor test block, the collection of readings, in response to one of: the device reaching the second test station, a number of readings exceeding a predetermined threshold, or expiration of a time period allocated for the collection of readings, wherein the readings are analyzed, including verifying responses of the sensors to the motions associated with the device movement between the first and second test stations.

5. The method of claim 4, further comprising: providing, by the sensor test block, the collected readings to the device or to an external device for analysis and processing.

6. The method of claim 4, wherein the plurality of sensors includes at least one of: a gyroscope, or an accelerometer, wherein the device comprises a computing device.

7. The method of claim 4, wherein the second test station is a last test station on the manufacturing line, wherein the method further comprises: rendering, by the sensor test block, the collected readings for display on the device at the second test station.

8. The method of claim 4, further comprising: analyzing, by the sensor test block, the collected readings, including verifying responses of the sensors to motions associated with the device movement between the first and second test stations.

* * * * *